(12) United States Patent
Farges

(10) Patent No.: US 10,246,055 B2
(45) Date of Patent: Apr. 2, 2019

(54) METHOD FOR AUTHORIZING A DRIVER TO ACTIVATE AT LEAST ONE SYSTEM OF A VEHICLE, BASED ON A BIOMETRIC AUTHENTICATION PROCESS

(71) Applicant: DURA AUTOMOTIVE HOLDINGS U.K., LTD, Birmingham (GB)

(72) Inventor: Thomas Farges, Gometz le Chatel (FR)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/872,172

(22) Filed: Jan. 16, 2018

(65) Prior Publication Data
US 2018/0201225 A1 Jul. 19, 2018

(30) Foreign Application Priority Data
Jan. 16, 2017 (EP) ..................................... 17151558

(51) Int. Cl.
*B60R 25/25* (2013.01)
*G06F 21/32* (2013.01)
(Continued)

(52) U.S. Cl.
CPC .............. *B60R 25/25* (2013.01); *G06F 21/32* (2013.01); *H04L 63/0853* (2013.01);
(Continued)

(58) Field of Classification Search
CPC .............................. B60R 25/25; B60R 25/252
(Continued)

(56) References Cited

U.S. PATENT DOCUMENTS 8,451,105 B2 * 5/2013 McNay .................. B60R 25/25
340/426.11
9,242,619 B2 1/2016 Choi
(Continued)

FOREIGN PATENT DOCUMENTS

DE 10103044 A1 7/2002
DE 10064140 A1 9/2002
(Continued)

OTHER PUBLICATIONS

EP Extended Search Report for EP Application No. 17151558.8 dated Feb. 27, 2017, (10 pages).

*Primary Examiner* — Allen T Cao
(74) *Attorney, Agent, or Firm* — Reising Ethington P.C.

(57) ABSTRACT

A method for authorizing a driver to activate at least one system of a vehicle, includes a preliminary phase that includes an initialization step, an enrollment step scanning enrollment biometric data of the driver, an access step for the driver to enter the vehicle, and a storage step registering enrollment biometric data in memory. The method also includes a subsequent phase that includes an authentication step scanning authentication biometric data of the driver and comparing said authentication biometric data with the enrollment biometric data in the memory, then an activation step wherein, if the authentication biometric data match with the enrollment biometric data, in authorizing the driver to activate the at least one system of the vehicle, or a refusal step wherein, if the authentication biometric data does not match with the enrollment biometric data, in forbidding the driver to activate the at least one system of the vehicle.

20 Claims, 8 Drawing Sheets

(51) Int. Cl.
*H04L 29/06* (2006.01)
*H04W 12/06* (2009.01)
*H04W 4/80* (2018.01)

(52) U.S. Cl.
CPC ......... *H04L 63/0861* (2013.01); *H04W 12/06* (2013.01); *B60R 25/252* (2013.01); *B60R 2325/205* (2013.01); *H04W 4/80* (2018.02)

(58) Field of Classification Search
USPC .................................................. 340/5.5–5.54
See application file for complete search history.

(56) References Cited

U.S. PATENT DOCUMENTS

| 9,792,632 | B2* | 10/2017 | Betancourt | ........ G06Q 30/0601 |
| 2004/0232229 | A1 | 11/2004 | Gotfried et al. | |
| 2010/0148923 | A1 | 6/2010 | Takizawa | |
| 2015/0217726 | A1 | 8/2015 | Lee et al. | |
| 2016/0107655 | A1* | 4/2016 | Desnoyer | .............. B60W 50/14 |
| | | | | 701/23 |

FOREIGN PATENT DOCUMENTS

| KR | 20110038563 A | 4/2011 |
| WO | WO2015191913 A2 | 12/2015 |

\* cited by examiner

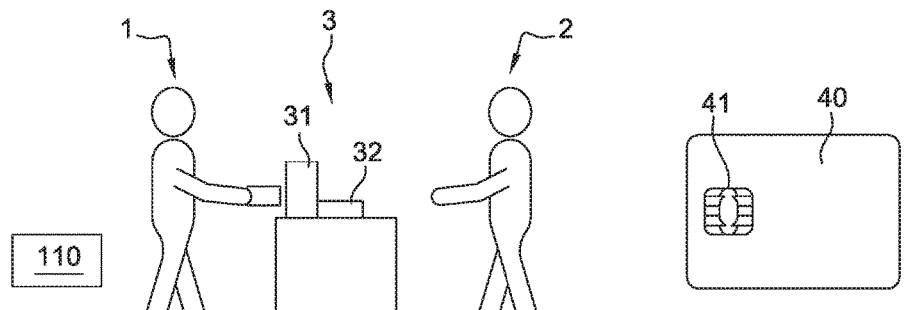
Fig. 2
Fig. 3
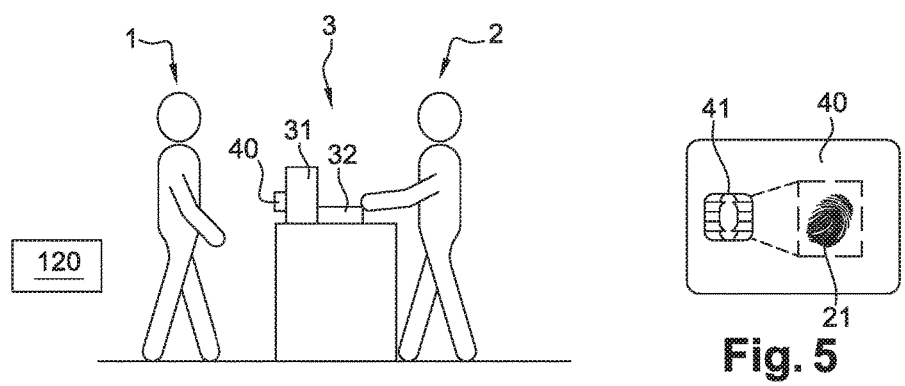
Fig. 4
Fig. 5
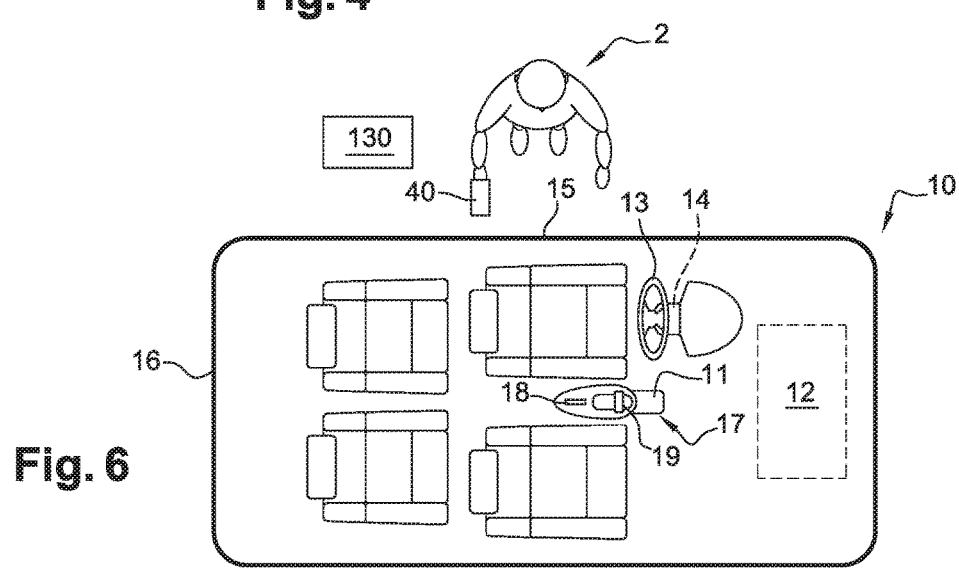
Fig. 6

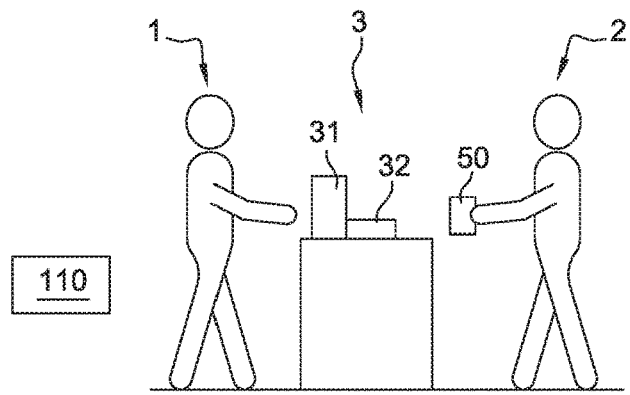
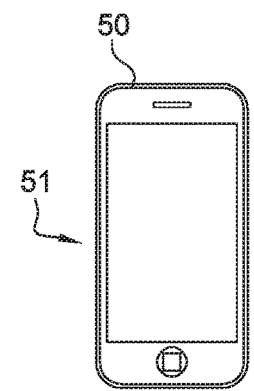
Fig. 11  Fig. 12
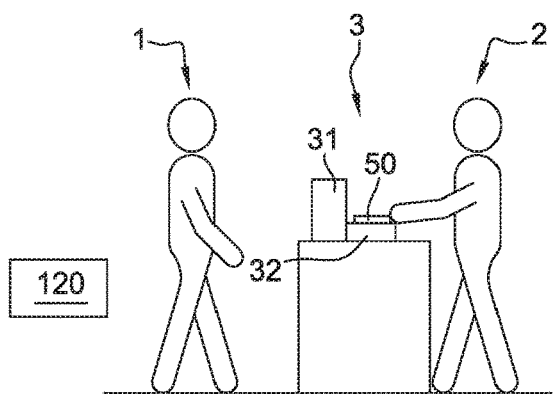
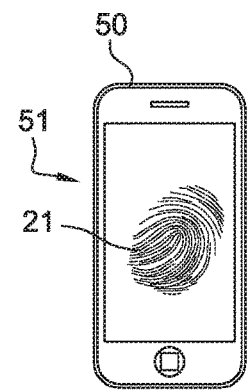
Fig. 13  Fig. 14
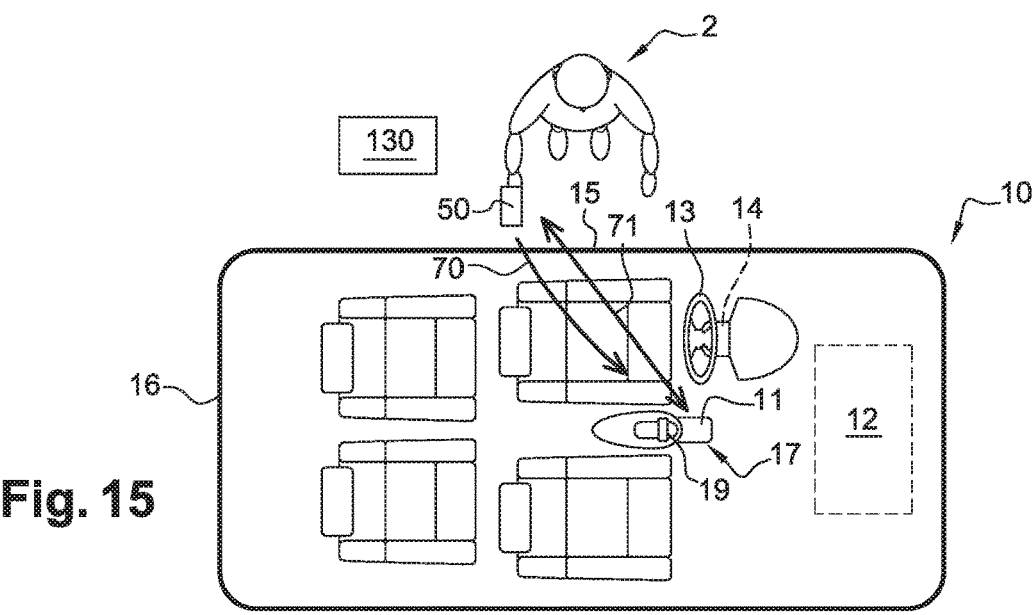
Fig. 15

METHOD FOR AUTHORIZING A DRIVER TO ACTIVATE AT LEAST ONE SYSTEM OF A VEHICLE, BASED ON A BIOMETRIC AUTHENTICATION PROCESS

CROSS REFERENCE TO RELATED APPLICATIONS

This application claims priority to European Patent Application No.: EP17151558.8 filed Jan. 16, 2017.

TECHNICAL FIELD

The invention concerns a method for authorizing a driver to activate at least one system of a vehicle, based on a biometric authentication process.

BACKGROUND

U.S. Pat. No. 6,810,309 discloses a method for authorizing a driver to drive a vehicle. This method comprises an enrollment step consisting in entering an administrator code, then using a biometric identification system to register the driver, inside the vehicle. This method further comprises an authentication step, consisting in comparing authentication biometric data newly scanned with enrollment biometric data previously registered.

US20150217726 discloses another method, with an enrollment step consisting in entering an administrator code or scanning biometric data of a master driver, then scanning biometric data of a new driver, inside the vehicle. Again, the authentication step consists in comparing authentication biometric data newly scanned with enrollment biometric data previously registered.

US2010060412 discloses another method, with an enrollment step consisting in scanning biometric data of a new driver directly on an electronic key integrating a scanner. The authentication step consists in inserting the electronic key in a corresponding socket equipping the vehicle, then comparing authentication biometric data newly scanned inside the vehicle with enrollment biometric data previously registered in the electronic key.

WO2015119417 discloses another method, wherein biometric data are stored in a smartphone.

US2006056663 disclose another method, wherein a biometric scanner is located outside the vehicle.

SUMMARY

The aim of the disclosure is to provide an alternative method based on a biometric authentication process.

To this end, the disclosure concerns a method for authorizing a driver to activate at least one system of a vehicle, said method comprising a preliminary phase and an subsequent phase based on a biometric authentication process; wherein the preliminary phase comprises:
an initialization step consisting for the owner of the vehicle in materially allowing the driver to perform further steps,
an enrollment step consisting in scanning enrollment biometric data of the driver,
an access step consisting for the driver to enter the vehicle;
a storage step consisting in registering said enrollment biometric data in a secured memory of the vehicle;
wherein the subsequent phase comprises:
an authentication step consisting in scanning authentication biometric data of the driver inside the vehicle and comparing said authentication biometric data with the enrollment biometric data registered in the secured memory of the vehicle, then
an activation step consisting, if the authentication biometric data match with the enrollment biometric data, in authorizing the driver to activate the at least one system of the vehicle, or
a refusal step consisting, if the authentication biometric data does not match with the enrollment biometric data, in forbidding the driver to activate the at least one system of the vehicle; and
wherein the enrollment step is performed on a biometric scanner installed at a dedicated location, outside the vehicle.

A driver can be authorized to drive a vehicle, based on a double security procedure. First, a preliminary authorization is issued by the owner of the vehicle at the time of enrollment of the driver. Secondly, a biometric authentication process ensures that the driver taking place in the vehicle is the same that enrolled earlier before the owner.

According to further aspects of the disclosure which are advantageous but not compulsory, such a method may incorporate one or several of the following features:
The initialization step and the enrollment step are performed at the same dedicated location, outside the vehicle.
The dedicated location is an enrollment center managing a fleet of vehicles.
The enrollment biometric data are erased from the secured memory of the vehicle after the driver relocks the vehicle or after a predefined period of time.
Inside the vehicle, biometric scanning operations are performed on a biometric scanner integrated to a shifter equipping the vehicle.
The secured memory of the vehicle is integrated to a shifter equipping the vehicle.
The biometric data include at least one fingerprint, a palmar venous network, an eye iris, facial features and/or voice.
The refusal step further consists in issuing a warning signal inside the vehicle and/or to a fleet management center.
The subsequent phase comprises implementing a second authentication process in addition to the biometric authentication process.
According to a first embodiment, in the initialization step, the owner issues a smart card configured to unlock openings of the vehicle; in the enrollment step, the enrollment biometric data of the driver are registered in a secured memory of the smart card; in the access step, the driver uses the smart card to unlock the openings of the vehicle; then in the storage step, the enrollment biometric data of the driver are transferred from the secured memory of the smart card to the secured memory of the vehicle.
In the storage step, the driver inserts the smart card in a card reader equipping the vehicle.
And the reader is integrated to a shifter equipping the vehicle.
According to a second embodiment, in the initialization step, the owner provides access to an application on a smartphone belonging to the driver, such that the smartphone is configured to unlock openings of the vehicle; in the enrollment step, the enrollment biometric data of the driver are registered in the smartphone; in the access step, the smartphone unlocks the openings of the vehicle; then in the storage step, the enrollment biometric data of the driver are transferred from the smartphone to the secured memory of the vehicle.

In the access step, the smartphone unlocks the openings of the vehicle and sends an identifier to the vehicle, then in response, the vehicle establishes a secured communication with the smartphone; and in the storage step, the enrollment biometric data of the driver are transferred from the smartphone to the secured memory of the vehicle via the secured communication.

According to a third embodiment, in the initialization step, the owner create a driver profile corresponding to the driver in an owner system, and provides access to an application on a smartphone belonging to the driver such that the smartphone is configured to unlock openings of the vehicle; in the enrollment step, the enrollment biometric data of the driver are registered in the driver profile in the owner system, then the driver profile is transferred to the smartphone, then the enrollment biometric data are erased from the owner system; in the access step, the smartphone unlocks the openings of the vehicle; then in the storage step, the driver profile including the enrollment biometric data of the driver are transferred from the smartphone to the secured memory of the vehicle.

In the access step, the smartphone having the application and the driver profile establishes a first secured communication with the owner system, the smartphone acquires an owner authorization message associated with the driver profile from the owner system via the first secured communication, then the smartphone sends the owner authorization message to the vehicle to unlock the openings of the vehicle, in response to the owner authorization message, the vehicle establishes a second secured communication with the smartphone, and the smartphone merges the owner authorization message and the driver profile including the enrollment biometric data of the driver to create a driver authorization message; and in the storage step, the driver authorization message, which includes the driver profile itself including the enrollment biometric data of the driver, is transferred from the smartphone to the secured memory of the vehicle via the second secured communication.

Also, the owner authorization message is created by the owner during the enrollment step.

And the owner authorization message associated with the driver profile includes at least an authorized period and/or an authorized speed.

BRIEF DESCRIPTION OF THE DRAWINGS

The invention will now be explained in correspondence with the annexed figures, and as an illustrative example, without restricting the object of the invention. In the annexed figures:

FIGS. 2 to 10 are schematic views illustrating the different steps of the method according to a first embodiment of the invention;

FIGS. 11 to 17 are schematic views, respectively similar to FIGS. 2 to 8, illustrating the different steps of the method according to a second embodiment of the invention.

DETAILED DESCRIPTION OF SOME EMBODIMENTS

Figure 1:
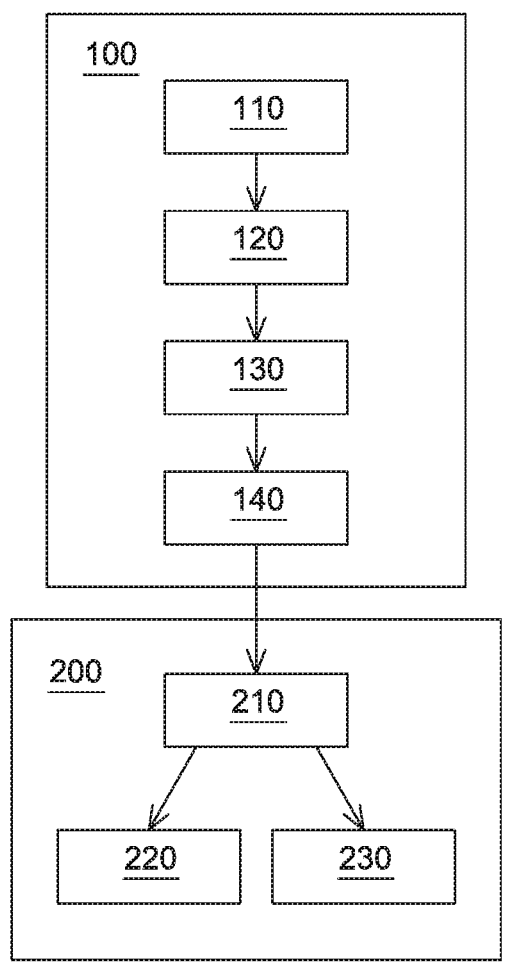
FIG. 1 is a histogram illustrating the method according to an embodiment of the invention.

FIG. 1 is a histogram illustrating the method according to an embodiment of the invention, for authorizing a driver to activate at least one system of a vehicle.

Said method comprises a preliminary phase 100 and a subsequent phase 200 based on a biometric authentication process. Phase 100 is performed only one time for a dedicated driver, while phase 200 is performed each time the driver enters the vehicle.

Phase 100 comprises an initialization step 110, an enrollment step 120, an access step 130 and a storage step 140. Phase 200 comprises an authentication step 210, and an activation step 220 or a refusal step 230. Steps 110, 120, 130, 140 and 210 are successive. Steps 220 and 230 are alternate steps following step 210, depending on the success or failure of the biometric authentication process.

FIGS. 2 to 10 show steps 110-230 in more details, for a method according to a first embodiment of the invention.

Said method is directed to authorize a driver 2 to activate at least one system 12 and/or 14 of a vehicle 10, based on a preliminary authorization by an owner 1 of the vehicle 10, and on a biometric authentication process.

Owner 1 can be a physical person or a moral person, like a rental company.

Steps 110 and 120 are performed at a dedicated location, outside vehicle 10. More precisely, the dedicated location is an enrollment center 3, used to manage a fleet of vehicles 10. The enrollment center 3 comprises at least a computer 31 and a biometric scanner 32, operated by the owner 1 (usually represented by an employee).

FIGS. 2 and 3 illustrate the initialization step 110, consisting for owner 1 of vehicle 10 in materially allowing driver 2 to perform further steps. FIG. 2 shows the enrollment center 3, where owner 1 issues a smart card 40 configured to unlock openings 15 and 16 of vehicle 10. FIG. 3 shows card 40, comprising a secured memory 41.

FIGS. 4 and 5 illustrate the enrollment step 120, consisting in scanning enrollment biometric data 21 of driver 2. In the represented example, data 21 is a fingerprint of driver 2. Alternately, data 21 may be a palmar venous network, an eye iris, facial features, voice, or any other suitable biometric data. FIG. 4 shows the enrollment center 3, where driver 2 uses scanner 32 to register his data 21 in memory 41 of card 40. FIG. 5 shows card 40, with data 21 registered in memory 41.

Card 40 itself is devoid of biometric scanner. Secured memory 41 stores data 21 of only one driver at a time.

FIG. 6 illustrates the access step 130, consisting for driver 2 to enter vehicle 10.

Vehicle 10 comprises a secured memory 11 connected to or integrated into its electronic central unit. Vehicle 10 further comprises an engine 12, a steering wheel 13, a steering column 14, several doors 15, a rear trunk 16, a shifter 17, a card reader 18 and a biometric scanner 19. Secured memory 11 may be integrated to the electronic board disposed inside the base of shifter 17. Reader 18 is fitted in the base of shifter 17. Also, scanner 19 is disposed at the upper extremity of the knob of shifter 17.

In the access step 130, driver 2 uses card 40 to unlock the openings 15 and 16 of vehicle 10. For example, a NFC reader is integrated to a trim component near the driver door 15 of vehicle 10, and reading card 40 unlocks doors 15 and trunk 16. Thus, driver 2 can open driver door 15 and sit in vehicle 10.

Figure 7:
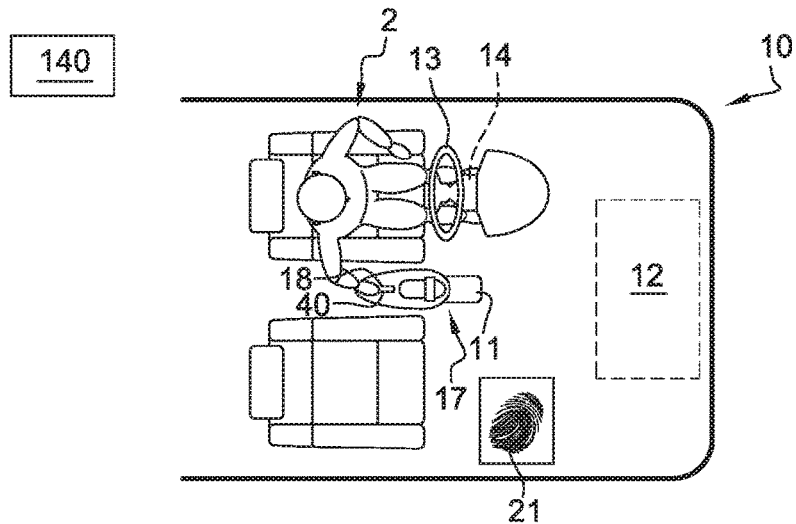

FIG. 7 illustrates the storage step 140, consisting in registering the enrollment biometric data 21 of driver 2 in the secured memory 11 of vehicle 10. Driver 2 inserts card 40 in card reader 18, so that data 21 of driver 2 are transferred from the secured memory 41 of card 40 to the secured memory 11 of vehicle 10.

Figure 8:
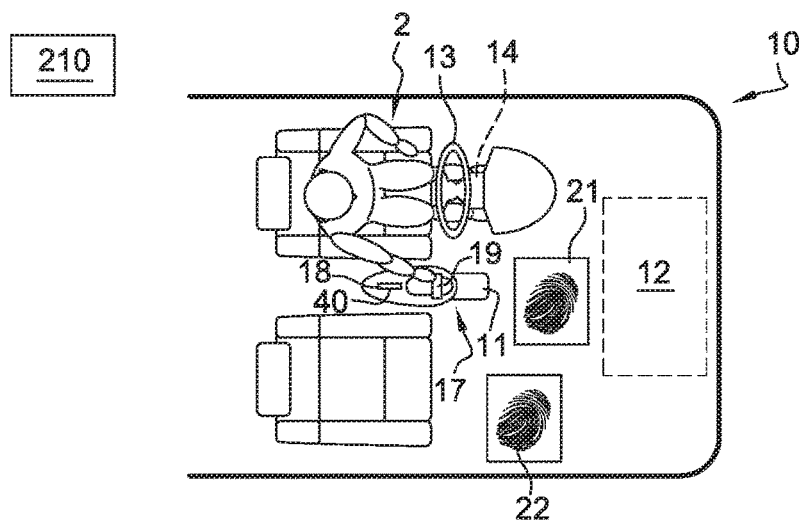

FIG. 8 illustrates the authentication step 210, consisting in scanning authentication biometric data 22 of driver 2 inside vehicle 10, then comparing said authentication biometric data 22 newly scanned with the enrollment biometric data 21 previously registered in the secured memory 11 of vehicle 10. Data 22 may be used for comparison but not registered in memory 11. Alternatively, data 22 may be temporarily registered in memory 11.

Figure 9:
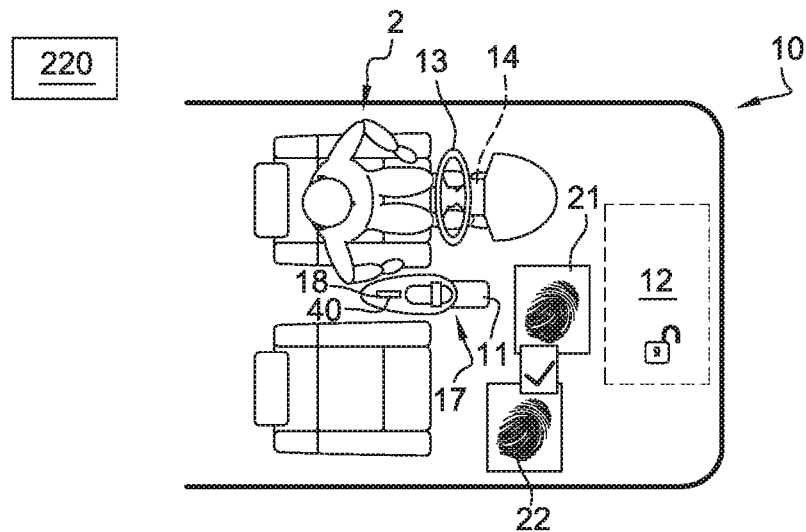

FIG. 9 illustrates the activation step 220 consisting, if the authentication biometric data 22 match with the enrollment biometric data 21, in authorizing driver 2 to activate the systems 12 and 14 of the vehicle 10. In other words, driver 2 can ignite engine 12 and rotate steering column 14, so as to drive vehicle 10.

Figure 10:
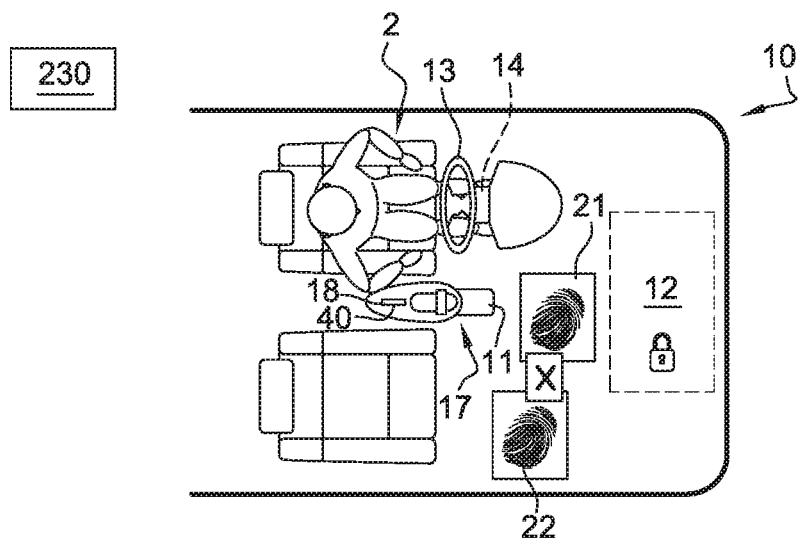

FIG. 10 illustrates the refusal step 230 consisting, if the authentication biometric data 22 does not match with the enrollment biometric data 21, in forbidding driver 2 to activate the at least one system 12 and/or 14 of the vehicle 10. In other words, driver 2 cannot ignite engine 12, nor rotate steering column 14. In addition, vehicle 10 may be configured such that its handbrake is locked when data 22 does not match data 21. As an alternative or a complement, vehicle 10 may be configured for issuing a warning signal, especially a visual signal and/or a sound signal, inside vehicle 10 or to the fleet management center. Other results may be implemented within the scope of the invention.

Biometric data 21 are erased from secured memory 11 of vehicle 10 when driver 2 relocks vehicle 10 (more precisely when driver 2 relocks openings 15 and 16 when leaving vehicle 10) or after a predefined period of time (starting at relocking of openings 14 and 16, or another predefined event).

Such method is secured, given that sensitive personal biometric data 21 and 22 do not stay stored in vehicle 10. Thus, these data 21 and 22 cannot be recovered and used by someone having access to vehicle 10.

In addition, only data 21 corresponding to current driver 2 are stored in memory 11. This speeds up comparison between data 21 and 22, and activation of system 12 and/or 14 of vehicle 10.

Other embodiments of the method according to the invention are illustrated on FIGS. 11 to 24. In these embodiments, elements similar to the first embodiment have the same references and work in the same way. Only the differences with respect to the first embodiment are described hereafter.

FIGS. 11 to 17 show steps 110-210 in more details, for a method according to a second embodiment of the invention.

FIGS. 11 and 12 illustrate the initialization step 110, consisting for owner 1 of vehicle 10 in materially allowing driver 2 to perform further steps. In the enrollment center 3, owner 1 provides access to an application 51 on a smartphone 50 belonging to driver 2, such that smartphone 50 is configured to unlock openings 15 and 16 of vehicle 10. Transfer of data to smartphone 50 can be made via USB connection with computer 31, NFC communication, internet communication, or any suitable means. Providing access to application 51 means that said application 51 is installed on smartphone 50 or can be accessed online from smartphone 50. Said access may be associated with a driver profile and a password.

FIGS. 13 and 14 illustrate the enrollment step 120, consisting in scanning enrollment biometric data 21 of driver 2. FIG. 13 shows the enrollment center 3, where driver 2 uses scanner 32 to register his data 21 in smartphone 50. FIG. 5 shows smartphone 50, with data 21 registered in its memory. Data 21 may be coded by application 51 and/or registered in a secured memory of smartphone 50.

FIG. 15 illustrates the access step 130, consisting for driver 2 to enter vehicle 10. More precisely, driver 2 uses smartphone 50 to unlock the openings 15 and 16 of vehicle 10. For example, a NFC or BLE reader is integrated to a trim component near the driver door 15 of vehicle 10, and reading smartphone 50 unlocks doors 15 and trunk 16.

Smartphone 50 unlocks the openings 15 and 16 of vehicle 10 and sends an identifier 70 to vehicle 10, then in response, vehicle 10 establishes a secured communication 71 with smartphone 50.

Figure 16:
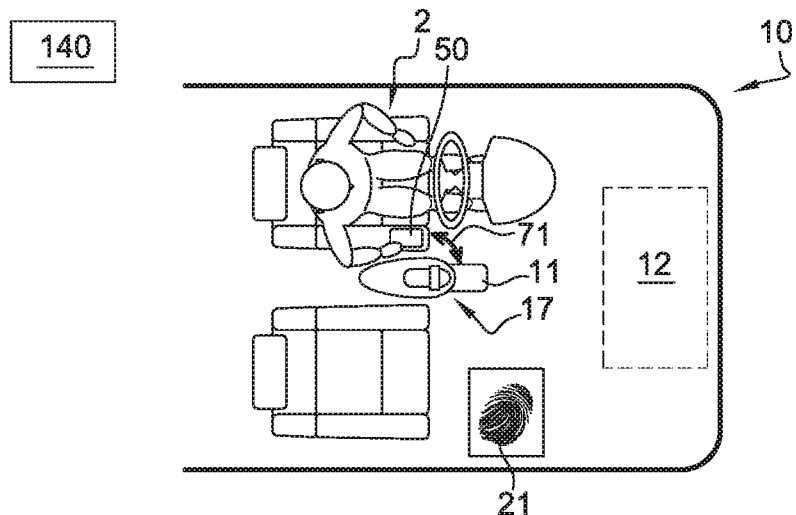

FIG. 16 illustrates the storage step 140, consisting in registering the enrollment biometric data 21 of driver 2 in the secured memory 11 of vehicle 10. More precisely, the enrollment biometric data 21 of driver 2 are transferred from smartphone 50 to the secured memory 11 of vehicle 10 via the secured communication 71. Communication 71 may use BLE standard (Bluetooth Low Energy).

Figure 17:
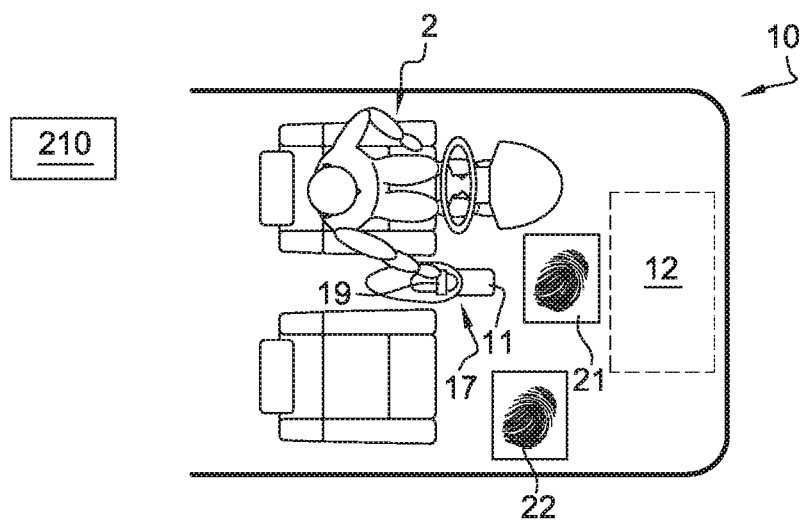

FIG. 17 illustrates the authentication step 210, consisting in scanning authentication biometric data 22 of driver 2 inside vehicle 10, then comparing said authentication biometric data 22 with the enrollment biometric data 21 previously registered in the secured memory 11 of vehicle 10.

Steps 210, 220 and 220 are similar to the first embodiment described above.

FIGS. 18 to 24 show steps 110-210 in more details, for a method according to a third embodiment of the invention.

Figure 18:
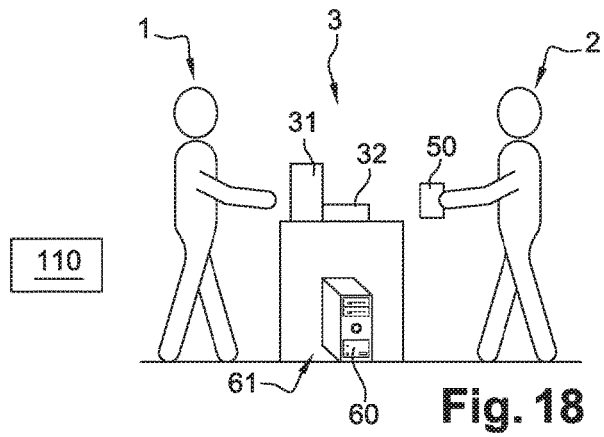
FIGS. 18 to 24 are schematic views, respectively similar to FIGS. 2 to 8, illustrating the different steps of the method according to a third embodiment of the invention.
Figure 19:
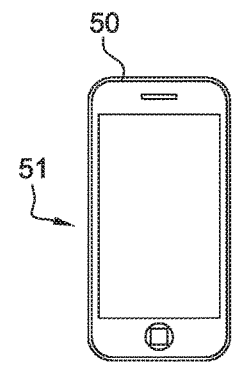

FIGS. 18 and 19 illustrate the initialization step 110, consisting for owner 1 of vehicle 10 in materially allowing driver 2 to perform further steps. Owner 1 registers a driver profile 61 corresponding to driver 2 in a secured server 60 installed in the enrollment center 3 or elsewhere, or directly in the computer 31 installed in the enrollment center 3, or anywhere in the owner system inside or outside the enrollment center 3. In addition, owner 1 provides access to an application 51 on a smartphone 50 belonging to driver 2, such that smartphone 50 is configured to unlock openings 15 and 16 of vehicle 10.

Figure 20:
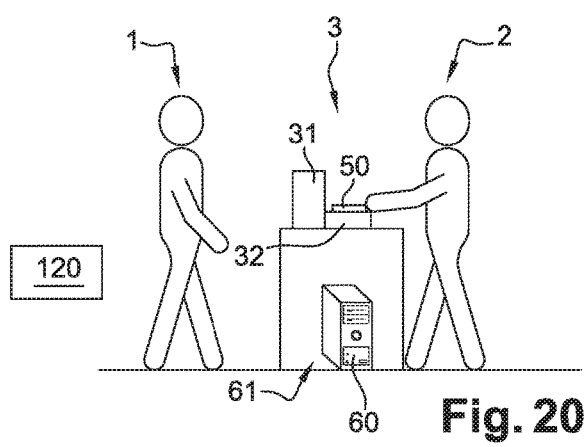
Figure 21:
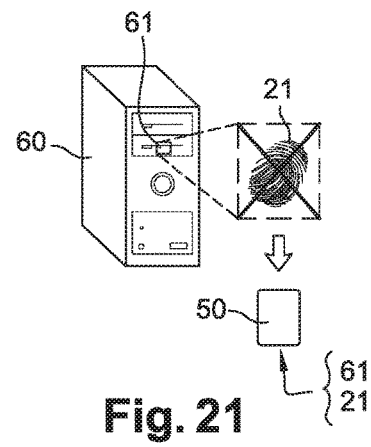

FIGS. 20 and 21 illustrate the enrollment step 120, consisting in scanning enrollment biometric data 21 of driver 2. FIG. 20 shows the enrollment center 3, where driver 2 uses scanner 32 to register his data 21 in his corresponding profile 61 in server 60. FIG. 21 shows server 60, with data 21 temporarily registered in its secured memory in association with profile 61. In a second stage, driver profile 61 including data 21 is transferred to smartphone 50. In a third stage, data 21 are erased from driver profile 61 registered in server 60.

An owner authorization message 83 is created by the owner during the enrollment step 120. The owner authorization message 83 associated with the driver profile 61 includes an authorized period, an authorized speed and/or any other relevant parameter related to the use of vehicle 10.

Figure 22:
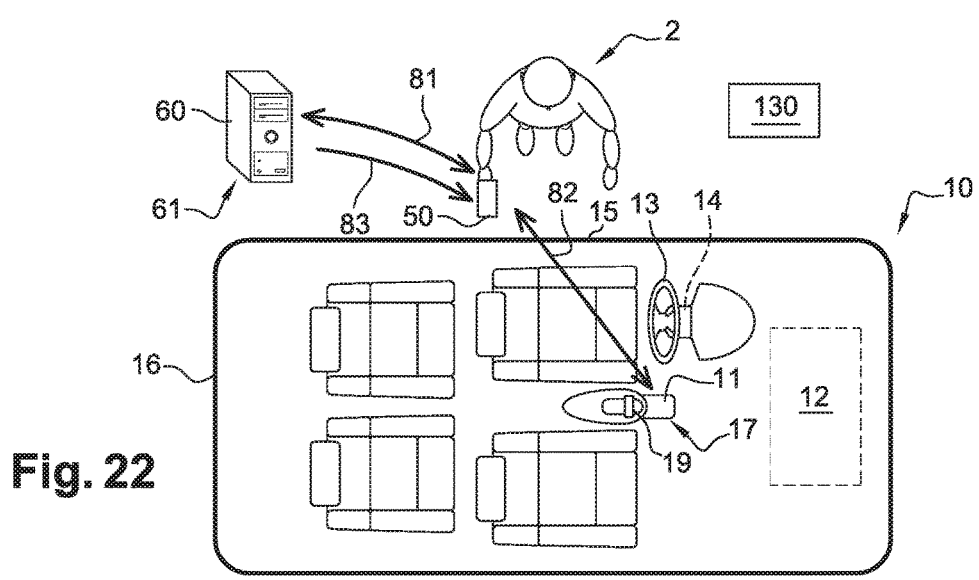

FIG. 22 illustrates the access step 130, consisting for driver 2 to enter vehicle 10. More precisely, driver 2 uses smartphone 50 to unlock the openings 15 and 16 of vehicle 10. For example, a NFC or BLE reader is integrated to a trim component near the driver door 15 of vehicle 10, and reading smartphone 50 unlocks doors 15 and trunk 16.

In the access step 130, smartphone 50 having application 51 and driver profile 61 establishes a first secured communication 81 with the owner system 31/60 (server 60 is represented on FIG. 22, but communication 81 can be established with another suitable element of the owner system for ensuring telematics service). Smartphone 50 acquires the owner authorization message 83 associated with the driver profile 61 from the owner system 31/60 via the first secured communication 81, then smartphone 50 sends message 83 to vehicle 10 to unlock the openings 15 and 16 of vehicle 10. In response to message 72, vehicle 10 establishes a second secured communication 82 with smartphone 50. In the meantime, smartphone 50 merges the owner authorization message 83 and the driver profile 61 including the enrollment biometric data 21 to create a driver authorization message 84. Communication 81 may use GSM standard, while communication 82 may use BLE standard.

Figure 23:
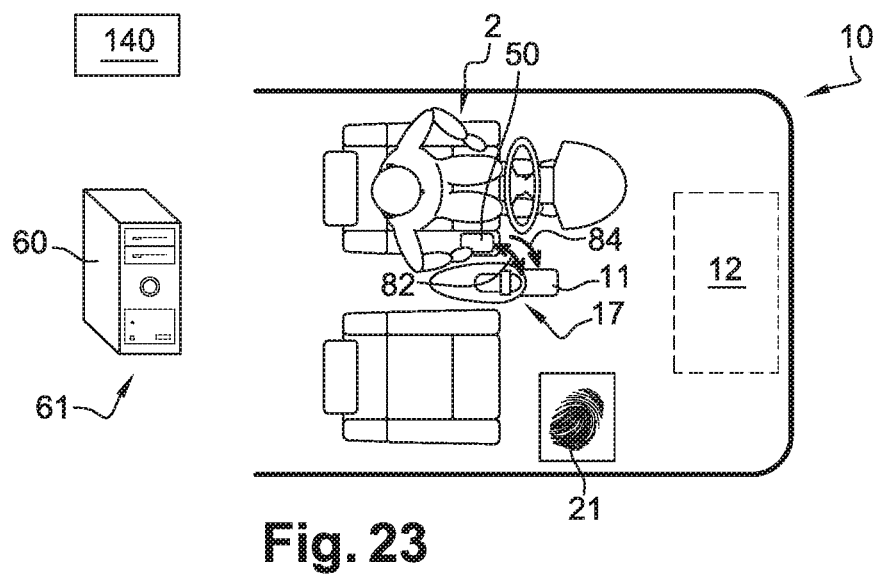

FIG. 23 illustrates the storage step 140, consisting in registering the enrollment biometric data 21 of driver 2 in the secured memory 11 of vehicle 10. More precisely, the driver authorization message 84, which includes the driver profile 61 itself including the the enrollment biometric data 21 of driver 2, is transferred from smartphone 50 to the secured memory 11 of vehicle 10 via the second secured communication 82.

Figure 24:
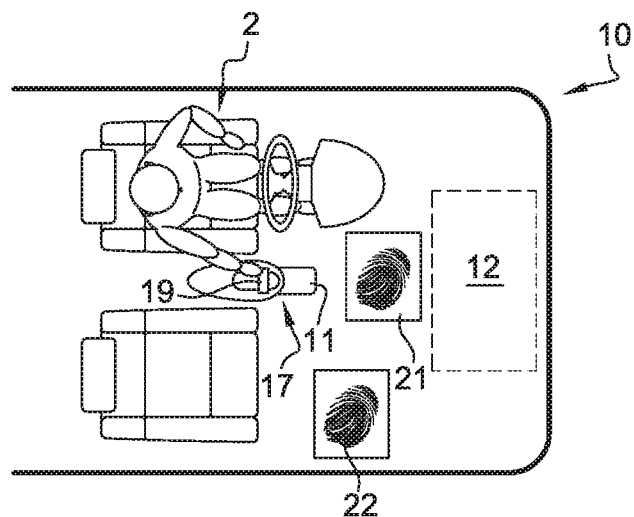

FIG. 24 illustrates the authentication step 210, consisting in scanning authentication biometric data 22 of driver 2 inside vehicle 10, then comparing said authentication biometric data 22 with the enrollment biometric data 21 previously registered in the secured memory 11 of vehicle 10.

Steps 210, 220 and 220 are similar to the first embodiment described above.

In other words:
in the first embodiment, owner 1 gives a card 40 to driver 2;
in the second embodiment, owner 1 loads an authorization on smartphone 50 of driver 2; and
in the third embodiment, owner 1 loads a driver profile 61 on smartphone 50 then uses a telematics service to send an authorization to smartphone 50 of driver 2.

Other non-shown embodiments can be implemented within the scope of the invention.

For example, phase 200 may comprise the implementation of a second authentication process complementary to the biometric authentication process. The second authentication process may include typing a password on a keyboard equipping vehicle 10, or (for the second and third embodiments) inserting a smart card in reader 18 equipping vehicle 10, or any other suitable authentication process.

In addition, technical features of the different embodiments can be, in whole or part, combined with each other.

The invention claimed is:

1. A method for authorizing a driver to activate at least one system of a vehicle, said method comprising a preliminary phase and a subsequent phase based on a biometric authentication process;
wherein the preliminary phase comprises:
an initialization step consisting for the owner of the vehicle in materially allowing the driver to perform further steps,
an enrollment step consisting in scanning enrollment biometric data of the driver,
an access step consisting for the driver to enter the vehicle;
a storage step consisting in registering said enrollment biometric data in a secured memory of the vehicle;
wherein the subsequent phase comprises:
an authentication step consisting in scanning authentication biometric data of the driver inside the vehicle and comparing said authentication biometric data with the enrollment biometric data registered in the secured memory of the vehicle, then
an activation step consisting, if the authentication biometric data match with the enrollment biometric data, in authorizing the driver to activate the at least one system of the vehicle, or
a refusal step consisting, if the authentication biometric data does not match with the enrollment biometric data, in forbidding the driver to activate the at least one system of the vehicle; and
wherein the enrollment step is performed on a biometric scanner installed at a dedicated location, outside the vehicle, wherein:
in the initialization step, the owner issues a smart card configured to unlock openings of the vehicle;
in the enrollment step, the enrollment biometric data of the driver are registered in a secured memory of the smart card;
in the access step, the driver uses the smart card to unlock the openings of the vehicle; then
in the storage step, the enrollment biometric data of the driver are transferred from the secured memory of the smart card to the secured memory of the vehicle.

2. Method according to claim 1, wherein the initialization step and the enrollment step are performed at the same dedicated location, outside the vehicle.

3. Method according to claim 1, wherein the dedicated location is an enrollment center managing a fleet of vehicles.

4. Method according to claim 1, wherein the enrollment biometric data are erased from the secured memory of the vehicle after the driver relocks the vehicle or after a predefined period of time.

5. Method according to claim 1, wherein in the storage step, the driver inserts the smart card in a card reader equipping the vehicle.

6. Method according to claim 5, wherein the reader is integrated to a shifter equipping the vehicle.

7. The method according to claim 1, wherein inside the vehicle, biometric scanning operations are performed on a biometric scanner integrated to a shifter equipping the vehicle.

8. The method according to claim 1, wherein the secured memory of the vehicle is integrated to a shifter equipping the vehicle.

9. The method according to claim 1, wherein the refusal step further consists in issuing a warning signal inside the vehicle and/or to a fleet management center.

10. The method according to claim 1, wherein the subsequent phase comprises implementing a second authentication process in addition to the biometric authentication process.

11. A method for authorizing a driver to activate at least one system of a vehicle, said method comprising a preliminary phase and a subsequent phase based on a biometric authentication process;
wherein the preliminary phase comprises:
an initialization step consisting for the owner of the vehicle in materially allowing the driver to perform further steps,
an enrollment step consisting in scanning enrollment biometric data of the driver, an access step consisting for the driver to enter the vehicle;

a storage step consisting in registering said enrollment biometric data in a secured memory of the vehicle;

wherein the subsequent phase comprises:

an authentication step consisting in scanning authentication biometric data of the driver inside the vehicle and comparing said authentication biometric data with the enrollment biometric data registered in the secured memory of the vehicle, then an activation step consisting, if the authentication biometric data match with the enrollment biometric data, in authorizing the driver to activate the at least one system of the vehicle, or a refusal step consisting, if the authentication biometric data does not match with the enrollment biometric data, in forbidding the driver to activate the at least one system of the vehicle; and wherein the enrollment step is performed on a biometric scanner installed at a dedicated location, outside the vehicle, wherein:

in the initialization step, the owner provides access to an application on a smartphone belonging to the driver, such that the smartphone is configured to unlock openings of the vehicle;

in the enrollment step, the enrollment biometric data of the driver are registered in the smartphone;

in the access step, the smartphone unlocks the openings of the vehicle; then in the storage step, the enrollment biometric data of the driver are transferred from the smartphone to the secured memory of the vehicle.

12. Method according to claim 11, wherein in the access step:

the smartphone unlocks the openings of the vehicle and sends an identifier to the vehicle, then in response, the vehicle establishes a secured communication with the smartphone; and in the storage step, the enrollment biometric data of the driver are transferred from the smartphone to the secured memory of the vehicle via the secured communication.

13. Method according to claim 11, wherein:

in the initialization step, the owner registers a driver profile corresponding to the driver in an owner system, and provides access to the application on a smartphone belonging to the driver such that the smartphone is configured to unlock openings of the vehicle;

in the enrollment step, the enrollment biometric data of the driver are registered in the driver profile in the owner system, then the driver profile is transferred to the smartphone, then the enrollment biometric data are erased from the owner system;

in the access step, the smartphone unlocks the openings of the vehicle; then in the storage step, the driver profile including the enrollment biometric data of the driver is transferred from the smartphone to the secured memory of the vehicle.

14. Method according to claim 13, wherein in the access step:

the smartphone having the application and the driver profile establishes a first secured communication with the owner system, the smartphone acquires an owner authorization message associated with the driver profile from the owner system via the first secured communication, then the smartphone sends the owner authorization message to the vehicle to unlock the openings of the vehicle and, in response to the owner authorization message, the vehicle establishes a second secured communication with the smartphone, and the smartphone merges the owner authorization message and the driver profile including the enrollment biometric data of the driver to create a driver authorization message; and in the storage step, the driver authorization message, which includes the driver profile itself including the enrollment biometric data of the driver, is transferred from the smartphone to the secured memory of the vehicle via the second secured communication.

15. Method according to claim 11, wherein inside the vehicle, biometric scanning operations are performed on a biometric scanner integrated to a shifter equipping the vehicle.

16. Method according to claim 11, wherein the secured memory of the vehicle is integrated to a shifter equipping the vehicle.

17. Method according to claim 11, wherein the biometric data include at least one fingerprint, a palmar venous network, an eye iris, facial features and/or voice.

18. Method according to claim 11, wherein the refusal step further consists in issuing a warning signal inside the vehicle and/or to a fleet management center.

19. Method according to claim 11, wherein the subsequent phase comprises implementing a second authentication process in addition to the biometric authentication process.

20. The method according to claim 11, wherein in the storage step, the driver inserts the smart card in a card reader equipping the vehicle, and wherein the reader is integrated to a shifter equipping the vehicle.

* * * * *